United States Patent
Moriconi et al.

(10) Patent No.: US 7,318,237 B2
(45) Date of Patent: * Jan. 8, 2008

(54) SYSTEM AND METHOD FOR MAINTAINING SECURITY IN A DISTRIBUTED COMPUTER NETWORK

(75) Inventors: Mark Moriconi, Atherton, CA (US); Shelly Qian, Cupertino, CA (US)

(73) Assignee: Bea Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/171,104

(22) Filed: Jun. 30, 2005

(65) Prior Publication Data

US 2005/0257247 A1    Nov. 17, 2005

Related U.S. Application Data

(63) Continuation of application No. 09/767,610, filed on Jan. 22, 2001, now Pat. No. 6,941,472, which is a continuation of application No. 09/721,557, filed on Nov. 22, 2000, which is a continuation of application No. 09/248,788, filed on Feb. 12, 1999, now Pat. No. 6,158,010.

(60) Provisional application No. 60/105,963, filed on Oct. 28, 1998.

(51) Int. Cl.
   *H04L 9/00*   (2006.01)

(52) U.S. Cl. ............... 726/27; 726/1; 709/223

(58) Field of Classification Search ............ 726/27
See application file for complete search history.

(56) References Cited

U.S. PATENT DOCUMENTS

| | | | |
|---|---|---|---|
| 5,173,939 A | 12/1992 | Abadi et al. | |
| 5,237,614 A | 8/1993 | Weiss | |
| 5,265,221 A | 11/1993 | Miller | ......... 711/163 |
| 5,347,653 A | 9/1994 | Flynn et al. | |
| 5,355,474 A | 10/1994 | Thuraisngham et al. | |
| 5,369,702 A | 11/1994 | Shanton | ......... 380/4 |
| 5,426,747 A | 6/1995 | Weinreb et al. | |
| 5,481,700 A | 1/1996 | Thuraisingham | |

(Continued)

FOREIGN PATENT DOCUMENTS

EP    0 398 645 A2    11/1990

(Continued)

OTHER PUBLICATIONS

U.S. Appl. No. 09/721,557, filed Nov. 22, 2000, Moriconi.

(Continued)

*Primary Examiner*—Nasser Moazzami
*Assistant Examiner*—Brandon S Hoffman
(74) *Attorney, Agent, or Firm*—Fliesler Meyer LLP

(57) ABSTRACT

A system and method for maintaining security in a distributed computing environment comprises a policy manager located on a server for managing and distributing a security policy, and an application guard located on a client for managing access to securable components as specified by the security policy. In the preferred embodiment, a global policy specifies access privileges of the user to securable components. The policy manager may then preferably distribute a local client policy based on the global policy to the client. An application guard located on the client then manages access to the securable components as specified by the local policy.

21 Claims, 14 Drawing Sheets

U.S. PATENT DOCUMENTS

| | | | |
|---|---|---|---|
| 5,544,322 A | 8/1996 | Cheng et al. | |
| 5,557,747 A | 9/1996 | Rogers et al. | 709/223 |
| 5,627,886 A | 5/1997 | Bowman | 379/111 |
| 5,797,128 A | 8/1998 | Birnbaum | |
| 5,809,230 A | 9/1998 | Pereira | 713/200 |
| 5,825,883 A | 10/1998 | Archibald et al. | |
| 5,826,000 A | 10/1998 | Hamilton | |
| 5,826,268 A | 10/1998 | Schaefer | |
| 5,835,726 A | 11/1998 | Shwed | 709/229 |
| 5,841,869 A | 11/1998 | Merkling et al. | 713/164 |
| 5,848,396 A | 12/1998 | Gerace | 705/10 |
| 5,867,667 A | 2/1999 | Butman et al. | |
| 5,889,953 A | 3/1999 | Thebaut et al. | |
| 5,918,210 A | 6/1999 | Rosenthal et al. | |
| 5,950,195 A | 9/1999 | Stockwell et al. | |
| 5,956,400 A | 9/1999 | Chaum et al. | |
| 5,956,521 A | 9/1999 | Wang | |
| 5,966,707 A | 10/1999 | Van Huben et al. | |
| 5,968,176 A * | 10/1999 | Nessett et al. | 726/11 |
| 5,983,270 A | 11/1999 | Abraham et al. | 709/224 |
| 5,983,350 A | 11/1999 | Minear et al. | 713/201 |
| 5,987,469 A | 11/1999 | Lewis et al. | |
| 5,987,611 A | 11/1999 | Freund | |
| 5,991,877 A | 11/1999 | Luckenbaugh | 713/200 |
| 5,999,978 A | 12/1999 | Angal et al. | 709/229 |
| 6,005,571 A * | 12/1999 | Pachauri | 715/764 |
| 6,006,194 A | 12/1999 | Merel | |
| 6,009,507 A | 12/1999 | Brooks et al. | 712/28 |
| 6,029,144 A | 2/2000 | Barrett et al. | |
| 6,029,182 A | 2/2000 | Nehab et al. | 715/523 |
| 6,029,246 A | 2/2000 | Bahr | |
| 6,035,399 A | 3/2000 | Klemba et al. | 713/200 |
| 6,055,515 A | 4/2000 | Consentino et al. | |
| 6,073,242 A | 6/2000 | Hardy et al. | |
| 6,083,276 A | 7/2000 | Davidson et al. | 717/107 |
| 6,098,173 A | 8/2000 | Elgressy et al. | |
| 6,141,010 A | 10/2000 | Hoyle | 715/854 |
| 6,141,686 A | 10/2000 | Jackowski et al. | |
| 6,148,333 A | 11/2000 | Guedalia et al. | |
| 6,154,741 A | 11/2000 | Feldman | 707/9 |
| 6,154,844 A | 11/2000 | Touboul et al. | |
| 6,157,924 A | 12/2000 | Austin | 707/10 |
| 6,158,010 A * | 12/2000 | Moriconi et al. | 726/1 |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,182,226 B1 | 1/2001 | Reid et al. | 713/201 |
| 6,182,277 B1 | 1/2001 | Degroot et al. | |
| 6,202,157 B1 | 3/2001 | Brownlie et al. | |
| 6,202,207 B1 * | 3/2001 | Donohue | 717/173 |
| 6,209,101 B1 | 3/2001 | Mitchem et al. | |
| 6,216,231 B1 | 4/2001 | Stubblebine | |
| 6,226,745 B1 | 5/2001 | Wiederhold | 713/200 |
| 6,241,608 B1 | 6/2001 | Torango | 463/27 |
| 6,253,321 B1 | 6/2001 | Nikander et al. | |
| 6,260,050 B1 | 7/2001 | Yost et al. | 715/501.1 |
| 6,269,393 B1 | 7/2001 | Yost et al. | 709/201 |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,985 B1 | 9/2001 | Horstmann | 705/14 |
| 6,295,607 B1 | 9/2001 | Johnson | |
| 6,308,163 B1 | 10/2001 | Du et al. | 705/8 |
| 6,317,868 B1 | 11/2001 | Grimm et al. | |
| 6,324,685 B1 | 11/2001 | Balassanian | |
| 6,341,352 B1 | 1/2002 | Child et al. | |
| 6,353,886 B1 | 3/2002 | Howard et al. | |
| 6,360,363 B1 | 3/2002 | Moser et al. | |
| 6,393,474 B1 | 5/2002 | Eichert et al. | |
| 6,397,222 B1 | 5/2002 | Zellweger | |
| 6,408,336 B1 | 6/2002 | Schneider et al. | |
| 6,412,077 B1 | 6/2002 | Roden et al. | |
| 6,418,448 B1 | 7/2002 | Sarkar | |
| 6,453,345 B2 | 9/2002 | Trcka | |
| 6,457,007 B1 | 9/2002 | Kikuchi et al. | |
| 6,460,141 B1 | 10/2002 | Olden | |
| 6,466,239 B2 | 10/2002 | Ishikawa | |
| 6,466,947 B2 | 10/2002 | Aronold et al. | |
| 6,473,791 B1 | 10/2002 | Al-Ghosein et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,519,647 B1 | 2/2003 | Howard et al. | |
| 6,530,024 B1 | 3/2003 | Proctor | |
| 6,539,375 B2 | 3/2003 | Kawasaki | 707/5 |
| 6,539,414 B1 | 3/2003 | Klein et al. | 718/101 |
| 6,571,247 B1 | 5/2003 | Danno et al. | 707/100 |
| 6,584,454 B1 | 6/2003 | Hummel et al. | |
| 6,587,849 B1 | 7/2003 | Mason et al. | 707/5 |
| 6,615,218 B2 | 9/2003 | Mandal et al. | |
| 6,618,806 B1 | 9/2003 | Brown et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,678,827 B1 | 1/2004 | Rothermel et al. | |
| 6,684,369 B1 | 1/2004 | Bernardo et al. | |
| 6,721,888 B1 | 4/2004 | Liu et al. | |
| 6,735,586 B2 | 5/2004 | Timmons | 707/3 |
| 6,735,701 B1 | 5/2004 | Jacobson | |
| 6,738,789 B2 | 5/2004 | Multer et al. | 707/201 |
| 6,751,659 B1 | 6/2004 | Fenger et al. | |
| 6,754,672 B1 | 6/2004 | McLauchlin | 707/104 |
| 6,769,118 B2 | 7/2004 | Garrison et al. | |
| 6,779,002 B1 | 8/2004 | Mwaura | 707/203 |
| 6,789,202 B1 | 9/2004 | Ko et al. | |
| 6,880,005 B1 | 4/2005 | Bell et al. | |
| 6,904,454 B2 | 6/2005 | Stickler | |
| 6,920,457 B2 | 7/2005 | Pressmar | |
| 6,922,695 B2 | 7/2005 | Skufca et al. | 707/10 |
| 6,934,934 B1 | 8/2005 | Osborne, II et al. | 717/126 |
| 6,941,472 B2 | 9/2005 | Moriconi et al. | |
| 6,950,825 B2 | 9/2005 | Chang et al. | |
| 6,957,261 B2 | 10/2005 | Lortz | |
| 6,965,999 B2 | 11/2005 | Fox et al. | |
| 6,970,876 B2 | 11/2005 | Hotti et al. | |
| 7,062,490 B2 | 6/2006 | Adya et al. | |
| 7,096,224 B2 | 8/2006 | Murthy et al. | |
| 7,174,563 B1 | 2/2007 | Brownlie et al. | |
| 2002/0059394 A1 | 5/2002 | Sanders | |
| 2002/0062451 A1 | 5/2002 | Scheidt et al. | |
| 2002/0069261 A1 | 6/2002 | Bellare et al. | |
| 2002/0107913 A1 | 8/2002 | Rivera et al. | |
| 2002/0173971 A1 | 11/2002 | Stirpe et al. | |
| 2002/0178119 A1 | 11/2002 | Griffin et al. | |
| 2003/0131113 A1 | 7/2003 | Reeves et al. | |
| 2003/0229623 A1 | 12/2003 | Chang et al. | |
| 2004/0205473 A1 | 10/2004 | Fisher et al. | |
| 2004/0205557 A1 | 10/2004 | Bahrs et al. | |
| 2004/0230546 A1 | 11/2004 | Rogers | |
| 2005/0050184 A1 | 3/2005 | Boden et al. | |
| 2005/0060324 A1 | 3/2005 | Johnson et al. | |
| 2006/0085412 A1 | 4/2006 | Johnson et al. | |

FOREIGN PATENT DOCUMENTS

| | | |
|---|---|---|
| EP | 1 256 889 A2 | 11/2002 |
| WO | WO 98/40987 | 9/1998 |
| WO | WO 98/40992 | 9/1998 |
| WO | WO 98/54644 | 12/1998 |
| WO | WO 99/57624 | 11/1999 |
| WO | WO 00/38078 | 6/2000 |
| WO | WO 01/14962 | 3/2001 |

WO 01/67285 A2 9/2001

OTHER PUBLICATIONS

Eiji Okamoto, "Proposal for Integrated Security Systems", Jun. 1992, IEEE Computer Society Press, p. 354-358.
http://java.sun.com/products/ejb/ (last visit: Dec. 7, 2004).
http://www.javaworld.com/javaworld/jw-12-2002/jw-1207-yesnoejb_p.html (last visit Dec. 7, 2004).
Sunsted, Todd, "JNDI Overview, Part 1: An Introduction to Naming Services", JavaWorld, Jan. 2000, pp. 1-6, (downloaded from: www.javaworld.com/javaworld/jw-01-howto_p.html).
Moore, Bill et al., "Migrating Weblogic Applications to WebSphere Advanced Edition", IBM Redbooks, Jan. 2001, pp. 1,3-4, 109-111 and 181-195.
Barrett, Alexandra, "Trying Out Transactions", SunExpert Magazine, Jan. 1999, pp. 57-59.
Ayers, Danny, et al., Professional Java Server Programming, Wrox Press, Ltd., Birmingham, UK, Dec. 1999, pp. 515-545.
Ford, Nigel, Web Developer.com Guide to Building Intelligent Web Sites with JavaScript, Wiley Computer Publishing, New York, NY, © 1998, pp. 65-85, 96-98, 101-102, 245-250 and 324-327.
Microsoft Computer Dictionary, 4th Edition, Microsoft Press, Redmond, WA © 1999, p. 489.
Bankers Trust, "Authorization Manager-User Guide" Copyright Feb. 1997, Bankers Trust. Print Date: Aug. 13, 1997.
Bankers Trust, "Security Instructions Services-User Guide" Copyright Feb. 1997, Bankers Trust. Print Date: Oct. 1, 1997.
Entitlenet, Inc., 6 Webpages from Website, URL: www.entitlenet.com/ Publication Date Unknown, Download Date: Nov. 17, 2000.
John Field, "From Authorization of Transactional Entitlement" Website of Transindigo, Inc., URL: www.transindigo.com/ Published: Sep. 2000.
John Field, "Dynamic Enterprise Entitlement", Website of Transindigo, Inc., URL: www.transindigo.com/ Published: Sep. 2000.
John Field, Using Elara (TM), Website of Transindigo, Inc., URL: www.transindigo.com/ Published: Sep. 2000.
Author Unknown, "AppShield (TM Version 3.0," (White Paper), Website of Sanctum, Inc., URL: www.sanctuminc.com Published Dec. 2000.
Hunter, Jason, "Java Servlet Programming", second edition, O'Reilly, Apr. 11, 2001.
USDataCenters . . . eBusiness, Business Wire, p. 2079. Apr. 4, 2001.
European Search Report for 02723874.0 dated Jun. 7, 2006 (3 pages).
Symborski, C.W., "Updating software and configuration data in a distributed communications network", Computer Networking Symposium, Washington, D.C., 1988, pp. 331-338.
European Search Report for EP 02 77 3915 dated Oct. 5, 2006 (3 pages).
Zhang, Zheng, et al., "Designing a Robust Namespace for Distributed File Services", Reliable Distributed System, 2001, Proceedings 20th IEEE Symposium on Oct. 28-31, 2001, pp. 162-171.
Adya, Atul, et al., "Farsite: Federated, Available, and Reliable Storage for an Incompletely Trusted Environment"ACM SIGOPS Operating Systems Review, vol. 36, Issue SI (Winter 2002), OSDI '02, Proceedings of the 5th Symposium on Operating Systems Design and Implementation, pp. 1-14.
Adomavicius, Gediminas, et al., "User Profiling in Personalization applications Through Rule Discovery and Validation", KDD '99, San Diego, CA, 1999, pp. 377-381.
Cingil, Ibrahim, et al., "A Broader Approach to Personalization", Communications of the ACM, vol. 43, No. 6, Aug. 2000, pp. 136-141.
Stephanidis, Constantine, et al., "Decision Making in Intelligent User Interfaces", IUI '97, Orlando, FL, 1997, pp. 195-202.
Stiemerling, Oliver, et al., "How to Make Software Softer—Designing Tailorable Applications", DIS '97, Amsterdam, The Netherlands, 1997, pp. 365-376.
Freudenthal, Eric et al., "dRBAC: Distributed Role-Based Access for Dynamic Coalition Enviornments", Proceedings of the 22nd International Conference on Distributed Computing Systems (ICDCS '02), IEEE 2002, 10 pages.
Howes, T., "The String Representation of LDAP Search Filters," Netscape Communications Corp., Request for Comments: 2254, 8 pages (Dec. 1997).
Supplementary European Seacrh Report for EP 01 97 5484 dates Dec. 19, 2006, 2 pages.
Kistler, Thomas, et al., "WebL—A Programming Language for the Web," Computer Networks and ISDN Systems, North Holland Publishing, Amsterdam, NL, vol. 30, No. 1-7, pp. 259-270 (Apr. 1998).
Levy, Michael R., "Web Programming in Guide," Software Practice & Experience, Wiley & Sons, Bognor Regis, GB, vol. 28, No. 15, pp. 1581-1603 (Dec. 25, 1998).
Atkins, David L., et al., "Mawl: A Domain-Specific Language for Form-Based Services," IEEE Transactions on Software Engineering, IEEE Service Center, Los Alamitos, CA, US, vol. 25, No. 3, pp. 334-346 (May 1999).
Parker, Elisabeth, The Complete Idiot's Guide® to Microsoft® FrontPage 2000, QUE®, Indiananpolis, IN, pp. 7 and 52 (1999).
Tanyi, Emmanuel, "Easy XML," www.winsite.com, pp. 1-6 (Mar. 2000).
"Method and System for Visually Constructing Document Type Definitions and Related Artifacts Using a Reusable Object Model," IBM Technical Disclosures Bulletin, May 31, 2001, 3 pages.
Candan, K. S., "Enabling Dynamic Content Caching for Database-Driven Web Sites," Proceedings of the 2001 ACM SIGMOD International Conference on Management of Data, May 21-24, 2001, Santa Barbara, CA, US, pp. 532-543.
Catley, Christina, et al., "Design of a Health Care Architecture for Medical Data Interoperability and Application Integration," Proceedings of the Second Joint EMBS/BMES Conference, Houston, Texas, US, Oct. 23-26, 2002, IEEE, vol. 3, pp. 1952-1953.
Browne, Shirley, et al., "Location-Independent Naming for Virtual Distributed Software Repositories," ACM Symposium on Software Reusability, Seattle, WA, US, vol. 20, Issue SI, pp. 179-185 (Aug. 1995).

* cited by examiner

SYSTEM AND METHOD FOR MAINTAINING SECURITY IN A DISTRIBUTED COMPUTER NETWORK

CLAIM OF PRIORITY AND CROSS-REFERENCE TO RELATED APPLICATIONS

This application is a continuation of U.S. application Ser. No. 09/767,610, filed Jan. 22, 2001, entitled "SYSTEM AND METHOD FOR MAINTAINING SECURITY IN A DISTRIBUTED COMPUTER NETWORK", now U.S. Pat. No. 6,941,472, issued Sep. 6, 2005, which is a continuation of U.S. application Ser. No. 09/721,557, filed Nov. 22, 2000, entitled "SYSTEM AND METHOD FOR MAINTAINING SECURITY IN A DISTRIBUTED COMPUTER NETWORK", which is a continuation of U.S. application Ser. No. 09/248,788, filed Feb. 12, 1999, now U.S. Pat. No. 6,158,010, issued Dec. 5, 2000, entitled "SYSTEM AND METHOD FOR MAINTAINING SECURITY IN A DISTRIBUTED COMPUTER NETWORK", which claims the benefit of U.S. Provisional Application No. 60/105,963, filed Oct. 28, 1998 entitled "SYSTEM AND METHOD FOR MAINTAINING SECURITY IN A DISTRIBUTED COMPUTER NETWORK", each of which applications are incorporated herein by reference.

BACKGROUND OF THE INVENTION

1. Field of the Invention

This invention relates generally to computer security systems, and relates more particularly to a system and method for managing and enforcing complex security requirements in a distributed computer network.

2. Description of the Background Art

Computer security issues have become more complex with the continual evolution of contemporary computer systems. As corporations utilize increasingly distributed and open computing environments, the security requirements of an enterprise typically grow accordingly. The complexity of employee, customer and partner access to critical information assets, while assuring proper security, has proven to be a major hurdle. For example, many organizations deploy applications that allow their external business partners, as well as their own internal employees, to access sensitive information resources within the enterprise. In the absence of adequate security measures, an enterprise may thus be subject to the risk of decreased security and confidentiality.

While most organizations focus their security concerns on protecting the internal network from the outside world, it is estimated that 80-90% of all corporate security breaches come from within an organization (source: Aberdeen Group, September 1997). This further underscores the need to specify and enforce an access control security policy within the enterprise network.

In today's complex business environment, specifying, stating, implementing and managing an enterprise access control policy may be both difficult and inefficient. When corporate data and applications revolved around a mainframe model, the problem of defining and managing access to corporate applications was relatively straightforward. Today, the complexity of business methods, as well as the complexity of distributed application architectures, may force companies to resort to manual, ineffective or highly custom approaches to access control in their attempts to implement the business process.

To secure a complex and distributed computer system, the system may typically employ a combination of encryption, authentication, and authorization technologies. Encryption is a means of sending information between participants in a manner that prevents other parties from reading the information. Authentication is a process of verifying a party's identity. Authorization is a technique for determining what actions a participant is allowed to perform.

Encryption and authentication are well-understood and have led to effective network security products, whereas authorization technology is not as well developed, and is often inadequate for many enterprises. The security approach of most companies today is to focus on the authentication of users to ensure that those users are part of the organization or a member of a select group. Authentication can be accomplished with a number of different approaches, from simple password or challenge response mechanisms to smart cards and biometric devices such as a fingerprint reader. Once users are authenticated, however, there is still a significant problem in managing and enforcing their set of privileges, which may be unique and vary widely between users. The same authentication mechanism can be used for every user, but different authorization mechanisms must be developed for most applications. Therefore, reliable and efficient access control is a much more difficult problem facing enterprises today.

Authentication mechanisms often work together with some sort of access control facility that can protect information resources from unauthorized users. Examples of network security products include firewalls, digital certificates, virtual private networks, and single sign-on systems. Some of these products provide limited support for resource-level authorization. For example, a firewall can screen access requests to an application or a database, but does not provide object-level authorization within an application or database. Single Sign-On (SSO) products, for example, maintain a list of resources an authenticated user can access by managing the login process to many different applications. However, firewalls, SSO and other related products are very limited in their ability to implement a sophisticated security policy characteristic of many of today's enterprises. They are limited to attempting to manage access at a login, or "launch level", which is an all or nothing approach that inherently cannot implement a business-level policy.

A real-world security policy within a large enterprise is a detailed and dynamic knowledge base specific to that organization. The authorization privileges are specific to the constantly evolving set of users, applications, partners, and global policies that the enterprise puts in place to protect its key information resources. A security policy within a large enterprise can consist of tens or hundreds of thousands of individual rules that cover which users are authorized to access particular applications, perform various operations, or manage the delegation and transfer of tasks. Many of these policy rules that implement the business practice of the organization have to be hard coded within custom-built applications or stored in the database.

The key problem is that these policy rules are localized, scattered throughout the organization, and embedded in applications and databases. Such embedding is expensive and error-prone, and mitigates against efficient policy updates. An organization cannot effectively implement and manage the resulting policy. Inconsistencies arise and updates can quickly become unmanageable. Policy queries and analysis from a global perspective are nearly impossible. The resulting policy begins to diverge from the intended business practices of the organization. Compromises are made in the policy implementation at the department level, and auditors can quickly become frustrated.

The increasing security risks associated with the proliferation of distributed computing, including Intranet and Extranet applications, are prompting many organizations to explore a broad range of security solutions for controlling access to their important information assets. Although organizations have a number of solutions to choose from for authenticating users (determining and verifying who is attempting to gain access to the network or individual applications), there is little choice when it comes to controlling what users can do and when they can do it to the extent necessary to implement the kinds of complex security policies required by modern organizations. Organizations have been forced to choose between custom authorization solutions that are costly, error-prone, and difficult to manage, or third-party solutions that are very limited in their ability to control access to information across applications and databases.

A real-world security policy within a large organization is a detailed and dynamic knowledge base that determines which users are authorized to access particular applications, perform various operations or manage the delegation and transfer of tasks, as well as when and under what circumstances they are permitted to do so. Authorization privileges depend upon a constantly evolving set of users, applications, partners, and business polices that comprise the enterprise security policy. A typical enterprise environment consists of several thousand users, hundreds of applications, and a myriad of network resources, resulting in a security policy that can consist of tens or hundreds of thousands of inter-related policy rules.

Typically, organizations attempt to control access to the internals of in-house applications through policy rules that are hard-coded in the application or through stored procedure statements in the database. But as the number of applications and databases grows, this patchwork approach to authorization quickly gets out of hand. First, organizations must incur the costly and time-consuming overhead of developing customized security code for each application. But more importantly, once the code is developed and embedded in an application, the embedded policy rules become impossible to track, difficult to update, and nearly impossible to manage because they are scattered throughout the organization.

With an estimated 80 percent of all security breaches coming from authorized users (source: Forrester Research), advanced policy features and enforcement mechanisms are needed to control access to sensitive information assets. To implement an enterprise policy, organizations need a centralized policy and a powerful way to specify policy rules to give them adequate access control security. At the same time, they need a distributed authorization infrastructure to provide authorization services to all applications with performance and scalability for modern distributed network environments.

Therefore, for the foregoing reasons, an improved system and method are needed to protect the distributed networks of enterprises against unauthorized access to their valuable information assets by managing and enforcing the complex security policy requirements of the organization.

SUMMARY OF THE INVENTION

In accordance with the present invention, a system and method are disclosed to manage and enforce complex security requirements for a computer system in a distributed computer network.

It is therefore an object of the present invention to provide an access control system that can manage individual transactions by users around well-defined, detailed objects within an application. It is also an object of the present invention to provide a policy manager that enables the creation, modification, querying, and analysis of an enterprise access-control policy, as well as the configuration and monitoring of integrated audit logs, while delivering the performance and scalability required to meet the demands of any enterprise. It is a further object of the present invention to provide a system that combines a centrally managed policy database with distributed authorization (access control) services that enforce the policy for all applications across the organization.

It is also an object of this invention to provide a system that works in conjunction with any authentication system, including digital certificates and smartcards, and obviates the need for single sign-on systems by letting organizations set detailed, dynamic rules for exactly who can access which applications, databases, and other network objects. It is a still further object of this invention to provide a robust security policy and authorization service that can be implemented in very heterogeneous environments, across all applications and databases within the organization, thereby completely eliminating the need for embedded, custom security code within applications, and making it possible to centrally manage and administer a consistent, robust security policy for all applications, databases, and network resources. Furthermore, organizations would no longer have to rely on authorization mechanisms provided by packaged or web application vendors that do not integrate with in-house or other third-party products.

In the preferred embodiment, the system comprises a policy manager located on a server for managing and distributing a local client policy based on a global security policy, and an application guard located on a client or server associated with one or more clients for managing access to securable components as specified by the local client policy. The global policy specifies access privileges of the user to securable components. The policy manager may then distribute a local client policy based on the global policy to the client or server. An application guard located on the client or server then manages authorization requests to the securable components as specified by the local client policy. Each authorization request may be recorded in an audit log to keep track of the authorization requests, whether they were granted or denied, and other useful information.

The system and method of the present invention supports centralized management and distributed authorization. A central policy server stores and manages the policy rules in a centrally administered database. A powerful graphical user interface is used to create, manage, and customize the elements of a policy. Security rules can be specified by both novice and expert users. A dedicated authorization service is associated with one or more applications. The central policy server automatically distributes (over the network) only the relevant portion of the enterprise policy to each remote service. This distributed architecture ensures that authorization requests are not bottlenecked at a central service point and provides unlimited scalability and maximum performance, regardless of the number of applications or policy rules involved.

A more sophisticated security policy is possible because the application has the ability to evaluate access privileges upon every access to the information, during every transaction, and at every data request.

Therefore, the present invention more efficiently and effectively manages and protects computer applications, databases, and network resources against unauthorized access in a distributed computer network.

DETAILED DESCRIPTION OF THE PREFERRED EMBODIMENT

The present invention relates to an improvement in security techniques to protect computer systems against unauthorized access. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for managing and enforcing complex security requirements in a distributed computer network, and comprises a policy manager located on a server for managing and distributing a policy to a client, and an application guard located on the client, the application guard acting to grant or deny access to various components of the client, as specified by the policy.

Figure 1:
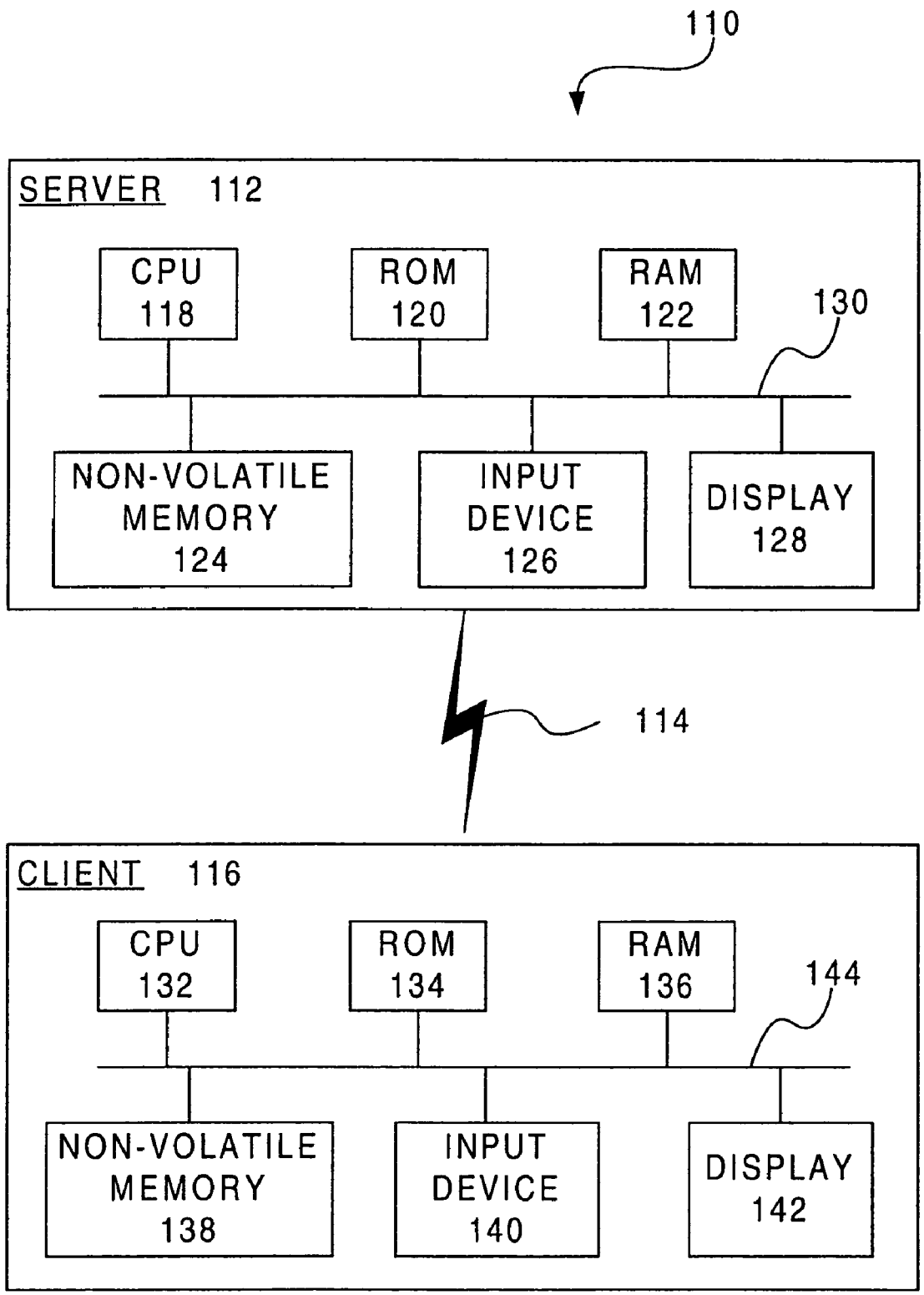
FIG. 1 is a block diagram of one embodiment for one system, in accordance with the present invention.

Referring now to FIG. 1, a block diagram of one embodiment of a distributed computer network system 110 is shown, including a server 112 connected via a network 114 to a client 116, in accordance with the present invention. One client 116 is shown, but server 112 is typically connected to many clients 116. In the FIG. 1 embodiment, server 112 may preferably include a central processing unit (CPU) 118, a read-only memory (ROM) 120, a random-access memory (RAM) 122, a non-volatile memory 124, an input device 126, and a display 128 all connected via a bus 130.

Similarly client 116 may preferably include a central processing unit (CPU) 132, a read-only memory (ROM) 134, a random-access memory (RAM) 136, a non-volatile memory 138, an input device 140, and a display 142 all connected via a bus 144.

Server 112 preferably contains a program stored in non-volatile memory 124 for managing a policy or a set of rules and then distributing the policy to client 116 via link 114. Client 116 preferably contains a program stored in non-volatile memory 138 for granting or denying access to various components or resources of client 116, as specified by the policy distributed from server 112. For example, various components or resources of client 116 can include applications, functions or procedures within an application, data structures within an application, and database or file system objects referenced by an application.

Figure 2:
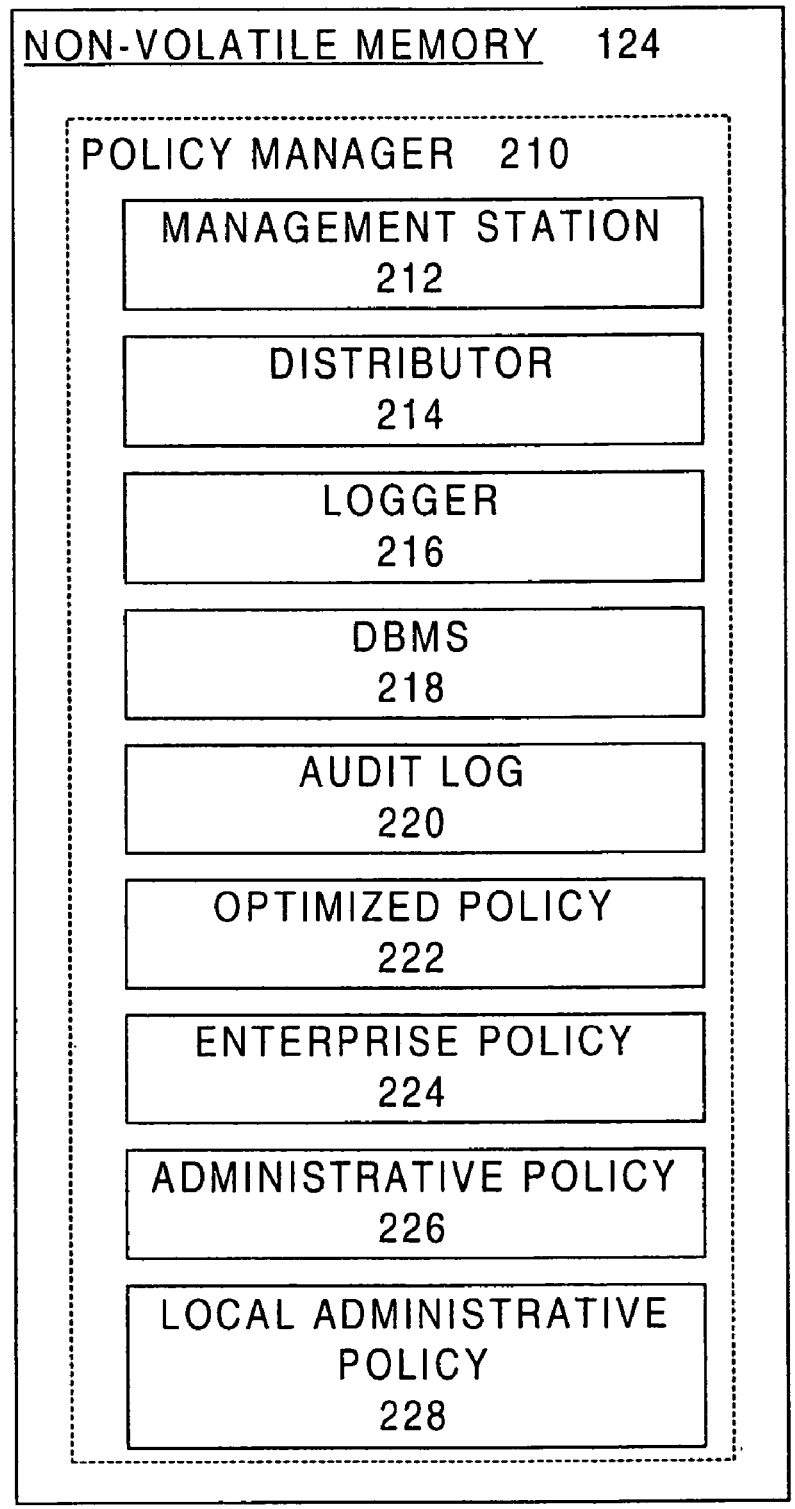
FIG. 2 is a block diagram of one embodiment of the non-volatile memory located within the server in FIG. 1, according to the present invention.

Referring now to FIG. 2, a block diagram of one embodiment for non-volatile memory 124, located within server 112 of FIG. 1, is shown. In the FIG. 2 embodiment, non-volatile memory 124 includes a policy manager 210 that manages and distributes a policy. A policy is intended to specify the security requirements for applications and database objects. A policy may contain thousands of "security rules" that describe several constraints, including what applications a particular user can access, what objects (operations) within an application a user can access, and how those privileges are constrained by time, geography, or external events. In general, a policy or authorization policy should constrain access to both applications and the operations within them. The policy may be generalized to groups and hierarchies, not just specified for individual users. This would greatly improve manageability and lead to more comprehensible, business-level policies.

An authorization policy preferably consists of four components, including objects, subjects, privileges, and conditions. Objects may be applications, or the operations within an application. Examples of objects include applications or methods, web pages, database tables or files, and menu items in a graphical user interface. The granularity of objects has a direct impact on the level of security achieved. The less information an object contains, it is less likely that a user has access to information not needed to perform his job function. On the other hand, the granularity of objects should be balanced against the ease of security management The more information an object contains, the fewer objects that have to be protected, and the smaller the policy is.

Objects are preferably organized into an object hierarchy. If an object represents an application, then its children objects might represent the methods with the application. Similarly, if an object represents a database, then its children objects might represent the tables and views within the database.

If a user is granted a certain privilege on a parent object, then he is automatically granted the privilege on all the children objects. Similarly, if a user is denied a certain privilege on a parent object, then he is automatically denied the privilege on all the children objects. In other words, privileges are inherited from parent to children objects. Privilege inheritance through the object hierarchy eases security management because rather than granting the same privilege to every child object, the privilege is granted once to the parent object, and if the privileges of an object change, the policy on all the children objects automatically reflect the changes made to the object.

Subjects may be users, or roles containing users, who access protected objects. Subjects correspond to users that have access to information in a system. Users can either be internal or external to a system. Users are authorized to access information in order to perform their job functions. Such access may be controlled so that a user gets access only to the information needed to perform his job function.

An object, such as an application or a database, typically has its own list of users. These are users who can log on to the object and be authenticated by the objects, sometimes through an external authentication server. In a large system, users are preferably maintained separately by one or more directory servers. Users are preferably extracted from objects or directory servers, and are maintained up-to-date by synchronizing with these objects and directory servers.

Alias users may also be supported. An alias of a user is another user who inherits all the privileges of the user under certain conditions. Alias facilitates authorization management by providing fine granularity of control on the propagation of privileges. For example, an alias of a user can be created to perform his job function while he is absent. The inheritance of privileges takes effect only when the user is absent. An alias implements the business requirements of delegation, where the privileges of a user can be delegated to another user under certain conditions. Conditional inheritance of privileges through an alias reduces the burden of security management, because it restricts privilege propagation to situations when certain conditions are satisfied.

Users of an object may be defined as being local to that object. In a typical system, the same user is often represented by different login identifications in different objects. This system may support the notion of a "global" user to capture this situation. Every global user is mapped to a set of local users, one per object. Global users facilitate the centralized management of users throughout the system, even if they are identified by different names in different objects.

A privilege defines the kinds of access that may be allowed on objects. In the preferred embodiment, a privilege is the right to perform a particular action on a specific object. The kinds of privileges that apply to an object depend on the type of the object. Examples of privileges include the right to execute an application, the right to download a web page, the right to query a database table, or the right to view a menu item.

Privileges are granted to users so they can accomplish tasks required for their job. A privilege should be granted to a user only when it is absolutely required for the user to accomplish a task. Excessive granting of unnecessary privileges may lead to compromised security. A user may receive a privilege in two different ways, privileges can be granted to users explicitly (for example, user SMITH can be granted the privilege to execute the payroll application), or privileges can be granted to a role (a named group of privileges), which is then granted to one or more users (for example, a role named "clerk" can be granted the privilege to execute the payroll application, and user SMITH can be granted the clerk role).

Roles are named groups of privileges that are granted to users or other roles. Users granted to a role are the members of that role. A role is often used to represent the set of privileges needed to perform a job function.

The members of a role automatically inherit all the privileges granted or denied to the role. In addition, roles may be organized into a role hierarchy, where parent roles are granted to children roles. If a parent role is granted a privilege, then the children roles are automatically granted the privilege. Similarly, if a role is denied a privilege, then the children roles are automatically denied the privilege.

Roles of an object may be defined as being local to that object. In a typical system, the same role is often represented by different names in different objects. This system may support the notion of a "global" role to capture this situation. Every global role is mapped to a set of local roles, one per object. Global roles facilitate the centralized management of roles throughout the system, even if they are identified by different names in different objects.

Role membership may be further constrained by the notion of mutual exclusion. Two roles are mutually exclusive if no single user can be granted to both roles simultaneously. Role mutual exclusion implements a business requirement of separation of duty. For example, a submit_budget role and an approve_budget role should be mutually exclusive, because no user should be simultaneously authorized to perform both actions.

In a typical policy, there are preferably two types of access rules, a grant rule, and a deny rule. A grant rule states that a privilege on an object is granted to a subject under an optional constraint. A deny rule states that a privilege on an object is denied to a subject under an optional constraint. Additionally, a wild card "any" may be used as a privilege, object, or subject, meaning that any legitimate value could be substituted in its place.

An access request preferably consists of a privilege, an object, and a subject, representing the fact that the subject request authorization of the privilege on the object. An access request matches a grant rule if the privilege, object, and subject match those in the rule, and the constraint in the rule evaluates to "true." An access request matches a deny rule if the privilege, object, and subject match those in the rule, and the constraint in the rule does not evaluate to "false."

An access request is denied if there is a deny rule matching the request, or there are no access rules matching the request. An access request is granted if there are no deny rules matching the request, and there is a grant rule matching the request.

Conditions define the constraints on when objects and subjects can be accessed. The constraints in an access rule specifies further requirements on when the access rule is applicable. These requirements could be conditioned on properties of the object or the subject.

Constraints are preferably expressions formed from conditions and Boolean operators NOT, AND, and OR. Three kinds of built-in conditions may be used: 1) relational operations=,<>,<,<=,>,>=on integers; 2) relational operations=,<>, LIKE, NOTLIKE on strings (the operator LIKE takes a string and a pattern and evaluates to true if the string matches the pattern, the operator NOTLIKE is the negation of LIKE); and 3) set operations IN, NOTIN (the operator IN on integers takes an integer and a set of integers and evaluates to "true" if the integer is in the set, the operator IN on strings is similarly defined, and the operator NOTIN is the negation of IN).

In addition to built-in conditions, users of system 110 may declare custom evaluation functions, which are customer-defined conditions. System 110 may provide an Application Programming Interface (API) for invoking customer-supplied code to evaluate custom evaluation functions. For example, an evaluation function could access a remote database to validate certain properties of the object. Another evaluation function could invoke an external server to authenticate the subject.

Now referring to the FIG. 2 embodiment, policy manager 210 preferably includes a management station program 212 to operate policy manager 210, a distributor program 214 to distribute local client policies to clients, a logger program 216 to track authorization requests, and a database management system (DBMS) 218 to maintain policy data files. Policy manager 210 also includes an audit log data file 220 to record authorization requests, an optimized policy data file 222, an enterprise policy data file 224, an administrative policy data file 226, and a local administrative policy data file 228. The contents and operation of policy manager 210 are further discussed below in conjunction with FIGS. 4, 8, 9, 10, 11, and 12.

Figure 3:
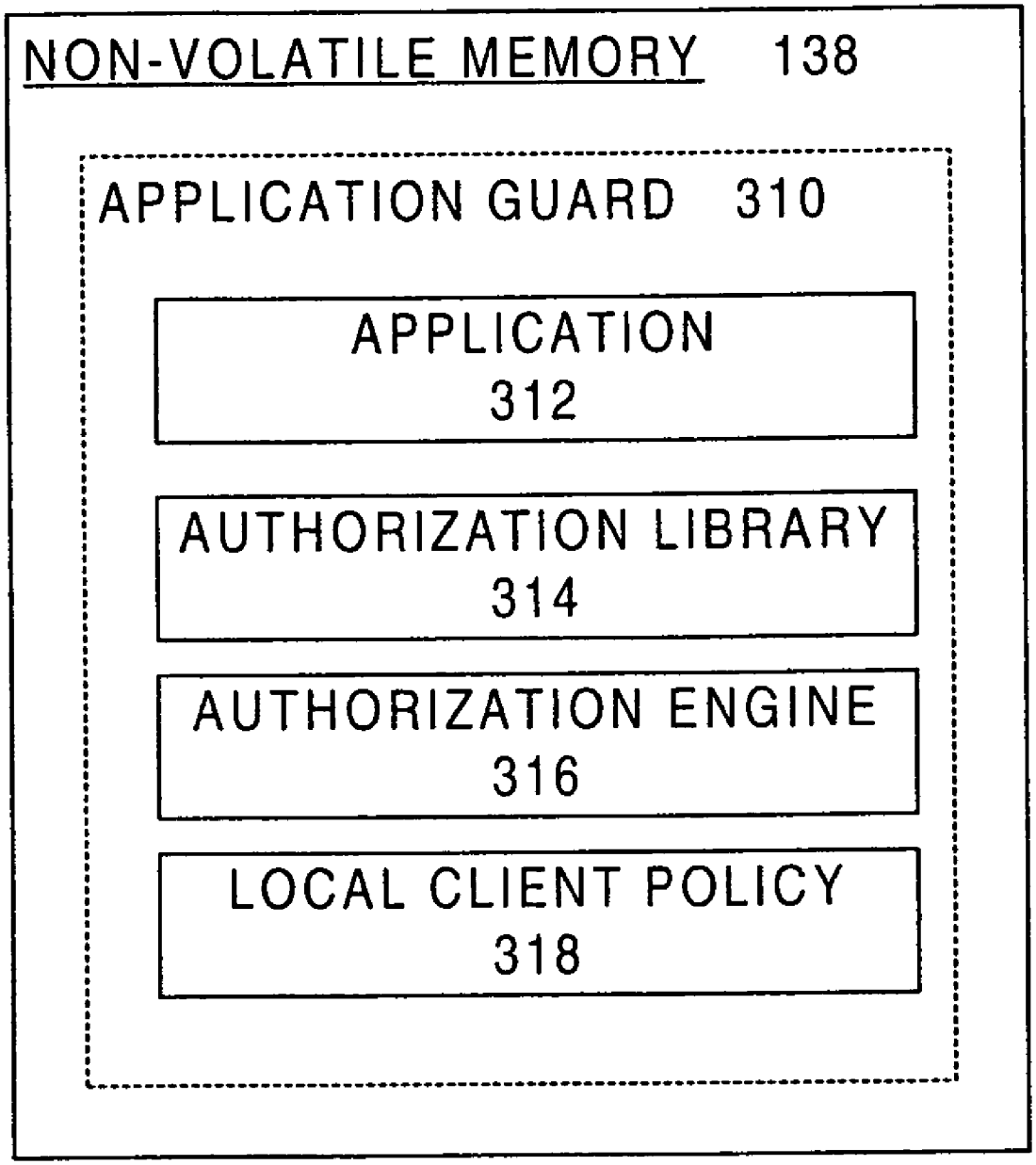
FIG. 3 is a block diagram of one embodiment of the non-volatile memory located within the client in FIG. 1, according to the present invention.

Referring now to FIG. 3, a block diagram of one embodiment for non-volatile memory 138, located within client 116 of FIG. 1, is shown. In the FIG. 3 embodiment, non-volatile memory 138 preferably includes an application guard 310 that grants or denies access to various components of client 116, as specified by a pre-determined policy. For example, various components of client 116 can include applications, data, and/or objects. In the FIG. 3 embodiment, application guard 310 preferably includes at least one application 312, an authorization library program 314, an authorization engine program 316, and a local client policy 318. The contents and operation of application guard 310 are further discussed below in conjunction with FIGS. 5, 13, and 14.

Figure 4:
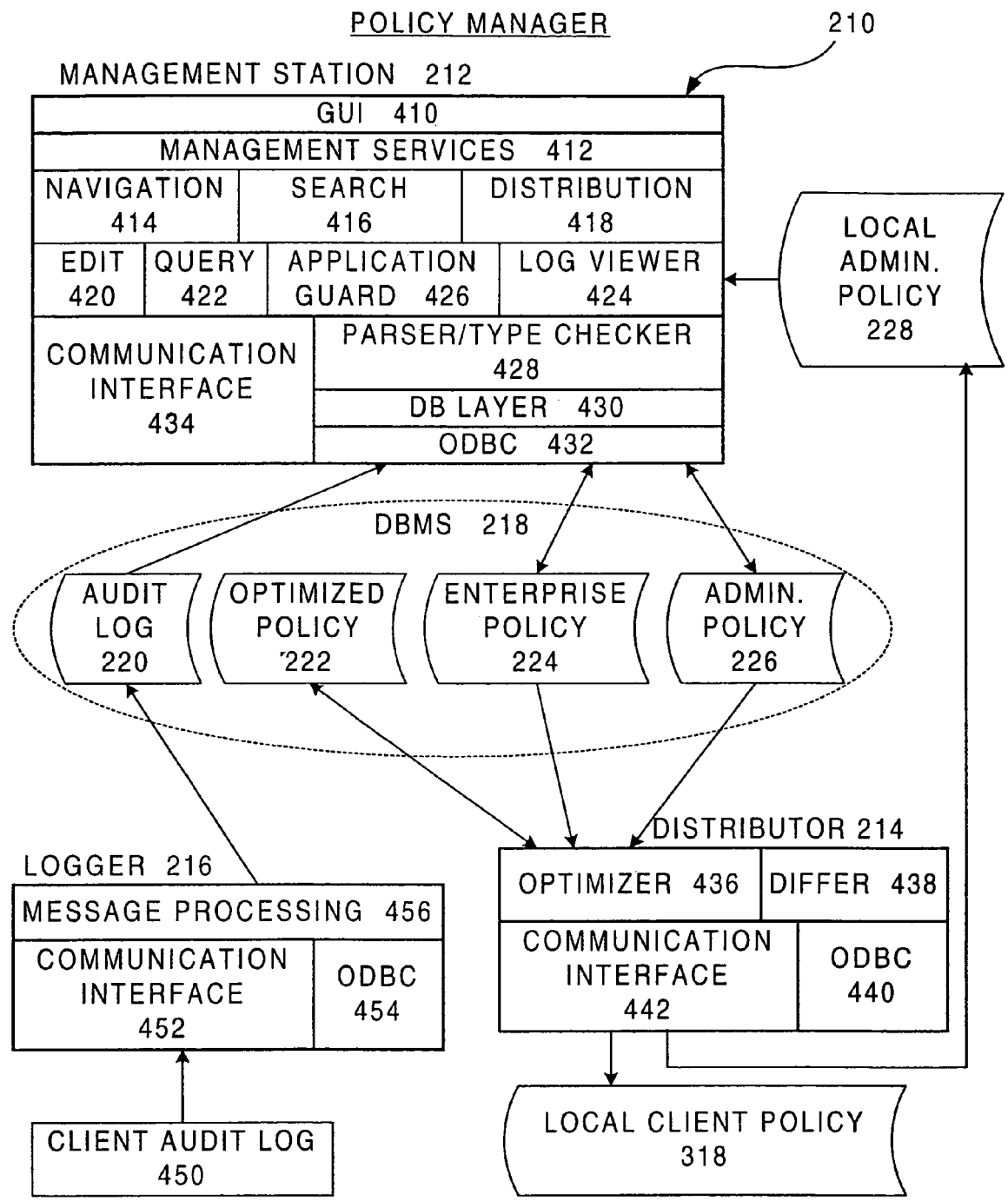
FIG. 4 is a block diagram of one embodiment of the policy manager located within the non-volatile memory in FIG. 2, in accordance with the present invention.

Referring now to FIG. 4, a block diagram of one embodiment for policy manager 210, located within non-volatile memory 124 in FIG. 2, is shown. In the preferred embodiment, policy manager 210 allows system users to implement, analyze, edit and update a centrally-managed security policy or enterprise policy 224. In the FIG. 4 embodiment, policy manager 210 preferably includes a management console or management station 212, a database management system 218, an audit facility or logger 216, and a distributor 214.

In the FIG. 4 embodiment, management station 212 preferably includes a graphical user interface (GUI) 410 for creating or customizing rules by system users. Management station 212 supports concurrent rule development by multiple users. Each policy rule preferably includes four basic components: 1) an object that is to be protected; 2) an access right or privilege; 3) a global or local user to which the privilege applies; and 4) conditions under which the privilege is granted or denied, including built-in access criteria such as time of day or location, as well as custom-defined access criteria.

Graphical user interface (GUI) 410 provides a user-friendly set of menu options or management services 412 to fully operate the policy manager. Programs controlled by the menu options may include navigation 414, search 416, distribution 418, edit 420, query 422, and log viewer 424. The operation of these programs are further discussed below in conjunction with FIGS. 8, 9, 10, 11, and 12. As an alternative to the GUI, the management services can be operated from an application through an API that allows programs to perform the same functions as a human operator. In the preferred embodiment, management station also includes an application guard 426 to allow only authorized administrators to operate management station 212. Local administrative policy 228 provides a set of policy rules specifying which users are authorized to access management station 212.

After the policy rules are created or modified using management station 212, they may then be distributed to appropriate clients 116. Management station 212 includes a communication interface 434 in order to pass information between various other components in system 110.

Prior to when the policy rules are distributed, a parser/type checker 428 preferably reviews and reconstructs the policy rules to make sure that they are syntactically and semantically correct according to a predefined policy language. The policy rules pass through a database layer (DB layer) 430 and an open database connectivity layer (ODBC) 432 before being stored as enterprise policy 224. DB layer 430 formats the policy rules into standard database storage tables, and ODBC 432 provides a common interface to various vendor-specific databases.

Enterprise policy 224 is then passed to distributor 214. An optimizer program 436 within distributor 214 determines which application guard 310 needs to receive which policy rules. A differ program 438 determines what type of changes were made to optimized policy 222, and then distributes only the changed policy rules or local client policy 318 to the appropriate application guards 310 through an ODBC layer 440 and a communication interface 442, which enforce access control to local applications and data.

Since the application guards 310 can be distributed among various clients 116, and each application guard 310 has its own specific local client policy 318, the system provides scalability.

Distributor 214 may also be used to optimize administrative policy 226 into an optimized administrative policy or local administrative policy 228 for use with application guard 426 in management station 212.

Figure 5:
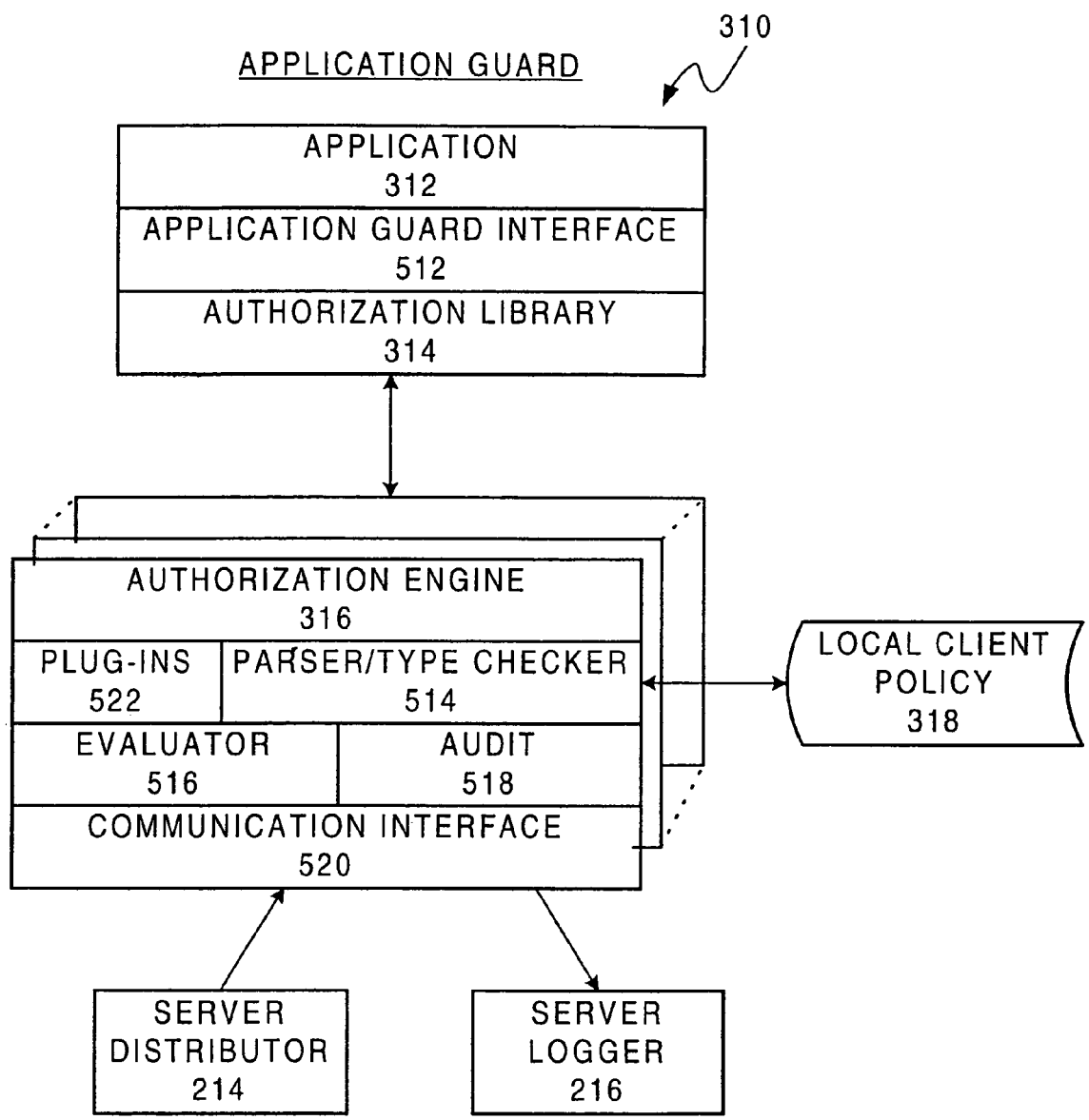
FIG. 5 is a block diagram of one embodiment of the application guard located within the non-volatile memory in FIG. 3, according to the present invention.

Referring now to FIG. 5, a block diagram of one embodiment of application guard 310, located within non-volatile memory 138 in FIG. 3, is shown. Application guard 310 may be distributed on clients 116 throughout an enterprise, and is designed to reside along with each of the protected applications having an associated application guard 310.

Application guard 310 supports transactional access control by allowing an application to be aware of the authorization service and to make authorization requests at each and every user interaction, data request, or business-level transaction. In addition, the design and integration of application guard 310 is fundamental to providing access control to business-level objects within an application since the authorization services have visibility to those named policy objects within the application.

In the FIG. 5 embodiment, application guard 310 is preferably integrated into application 312 through a high-level application programming interface (API) or authorization library 314 that allows application 312 to request authorization services as needed through an application guard interface 512. Typically, this can be done very quickly by including authorization requests at key points in application 312 for control user interaction or database access so that each interaction is protected with a minimum of development.

In the FIG. 5 embodiment, an authorization request is processed by authorization engine 316. A parser/type checker 514 parses local client policy 318 and stores the parsed local client policy in RAM 136. An evaluator 516 then determines whether the authorization request should be granted or denied by evaluating the authorization request with the parsed local client policy in RAM 136. Plug-ins 522 in authorization engine 316 allow for additional capabilities to process and evaluate authorization requests based on customized code. Each authorization request is then recorded in an audit log 518 and transmitted to logger 216 via a communication interface 520.

Users have the option of implementing application guard 310 locally to application 312, as a service running on the same system as application 312, or as a remote authorization service through a remote procedure call to another server. The advantage of the latter design would be to offload the application server from handling authorization services or allowing a single authorization server to handle a multiple number of applications. A local implementation would provide maximum performance and minimize any network traffic overhead.

As seen in FIG. 5, application guard 310 includes an application guard interface 512 coupled to an application 312 for requesting access to securable components. Application guard 310 also includes at least one authorization engine 316 for evaluating requests from application guard interface 512 as specified by local client policy 318. Multiple authorization engines 316 can be used for added performance and reliability. Furthermore, application guard interface 512 can be located on a client computer, while authorization engine 316 and local client policy 318 can be located on a client server.

The application guard authorization service of the present invention introduces virtually no performance overhead to an existing application 312. The policy rules developed at policy manager 210 are compiled into an optimized form before being distributed to the target application guards 310. This optimized form only distributes attributes relevant to that application guard 310, so that access requests may be evaluated by reviewing only a few rules rather than frequently analyzing the potentially large policy rule base.

Referring back to FIG. 4, logger 216 may then advantageously receive a client audit log 450 through a communication interface 452 and an ODBC 454 from authorization engine 316 (FIG. 5). Client audit log 450 is then formatted by message processing 456 before being stored in audit log 220. Audit log 220 may then be monitored via log viewer 424 in management station 212.

Figure 6:
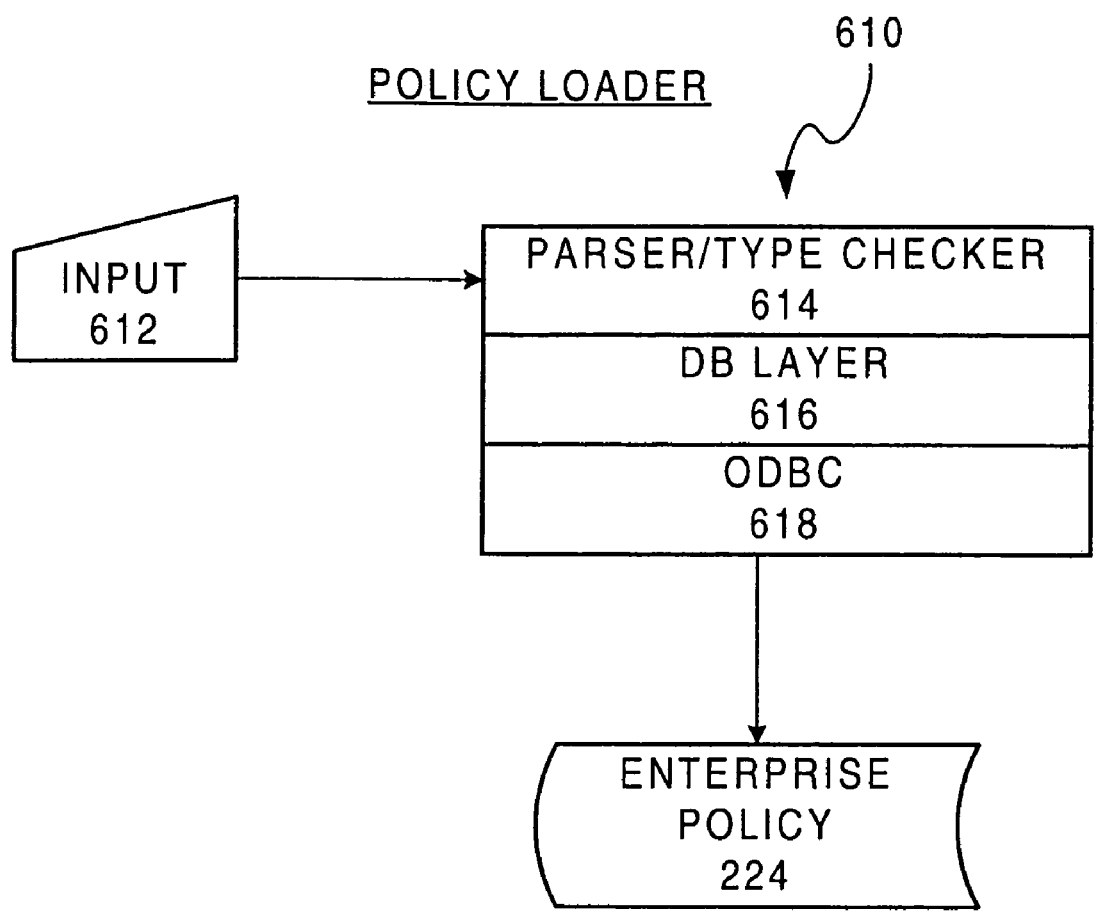
FIG. 6 is a block diagram of one embodiment of a policy loader, in accordance with the present invention.

Referring now to FIG. 6, a block diagram of one embodiment of a policy loader 610 is shown. In the FIG. 6 embodiment, policy rules may be entered one at a time into enterprise policy database 224 via management station 212 (FIG. 4), or the policy rules may alternatively be loaded as a batch process via policy loader 610. Policy loader 610 is an additional utility that bulk loads an existing set of policy rules into enterprise policy database 224. An existing set of policy rules may be entered into policy loader 610 via input 612. A parser/type checker 614 then preferably reviews and reconstructs the policy rules to make sure that they are syntactically and semantically correct according to a pre-defined policy language. The policy rules may then be passed through a DB layer 616 and an ODBC 618 before being stored in enterprise policy database 224.

Figure 7:
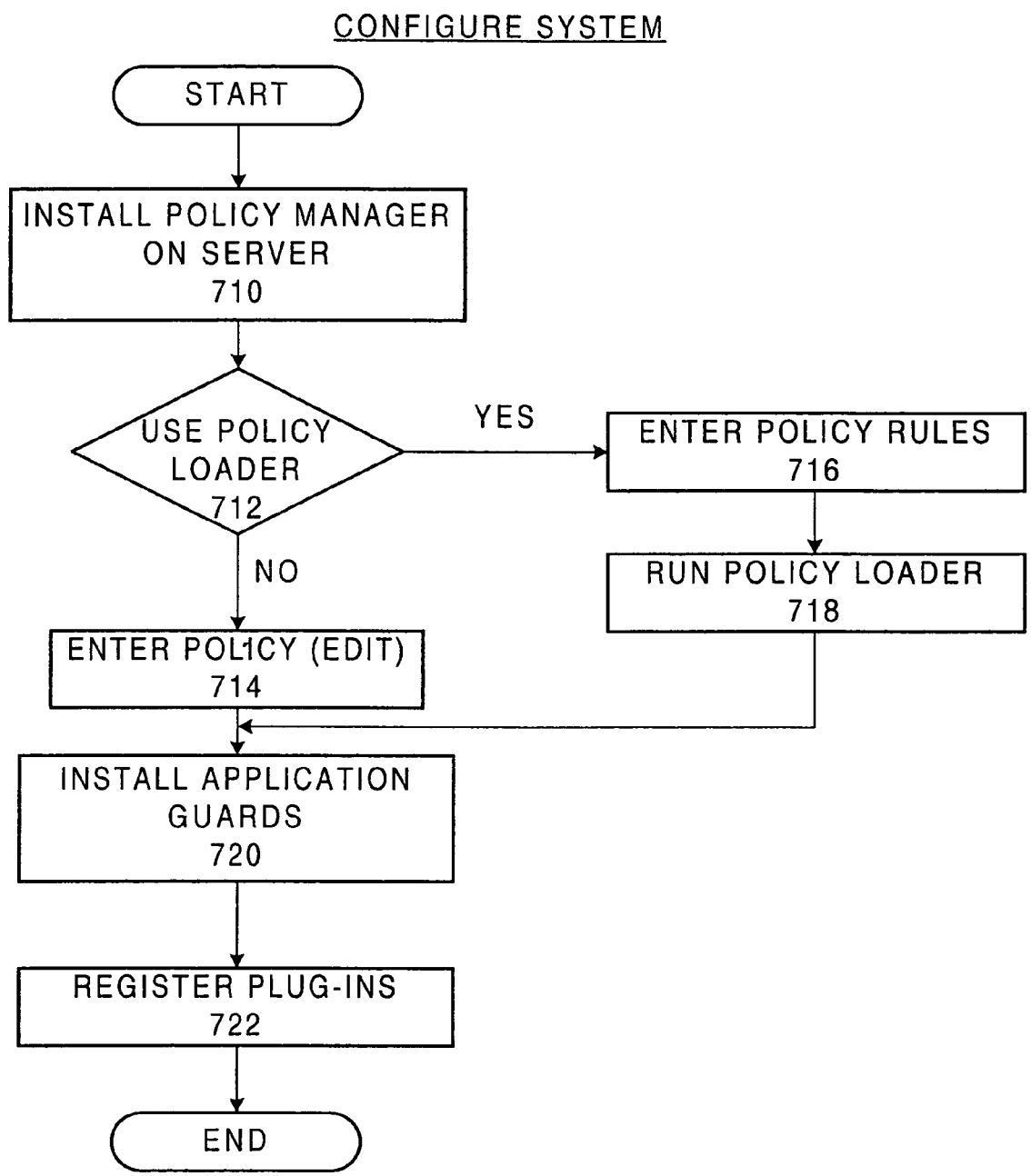
FIG. 7 is a flowchart of one embodiment of method steps to configure a system, in accordance with the present invention.

Referring now to FIG. 7, a flowchart of method steps to configure a system in accordance with one embodiment of the present invention is shown. Initially, in step 710, a system administrator installs policy manager 210 on a server 112. The installation may include management station 212, distributor 214, logger 216, and DBMS 218. After all the components of policy manager 210 have been installed, the system administrator then enters a set of policy rules. In step 712, the administrator can decide whether to use policy loader 610, or to use management station 212 to enter policy rules. If the system administrator decides to use management station 212, then at step 714, policy rules are entered using edit function 420. However, if policy loader 610 is used, then at step 716, policy rules are entered into a file, and at step 718, the file of policy rules passes to policy loader 610.

Next, in step 720, the system administrator installs application guards 310 onto client systems 116, as well as installing local client policies 318 onto client systems 116. Then at step 722, the system administrator registers plug-ins 522 into application guards 318 to allow for additional capabilities in order to process authorization requests based on customized code.

Figure 8:
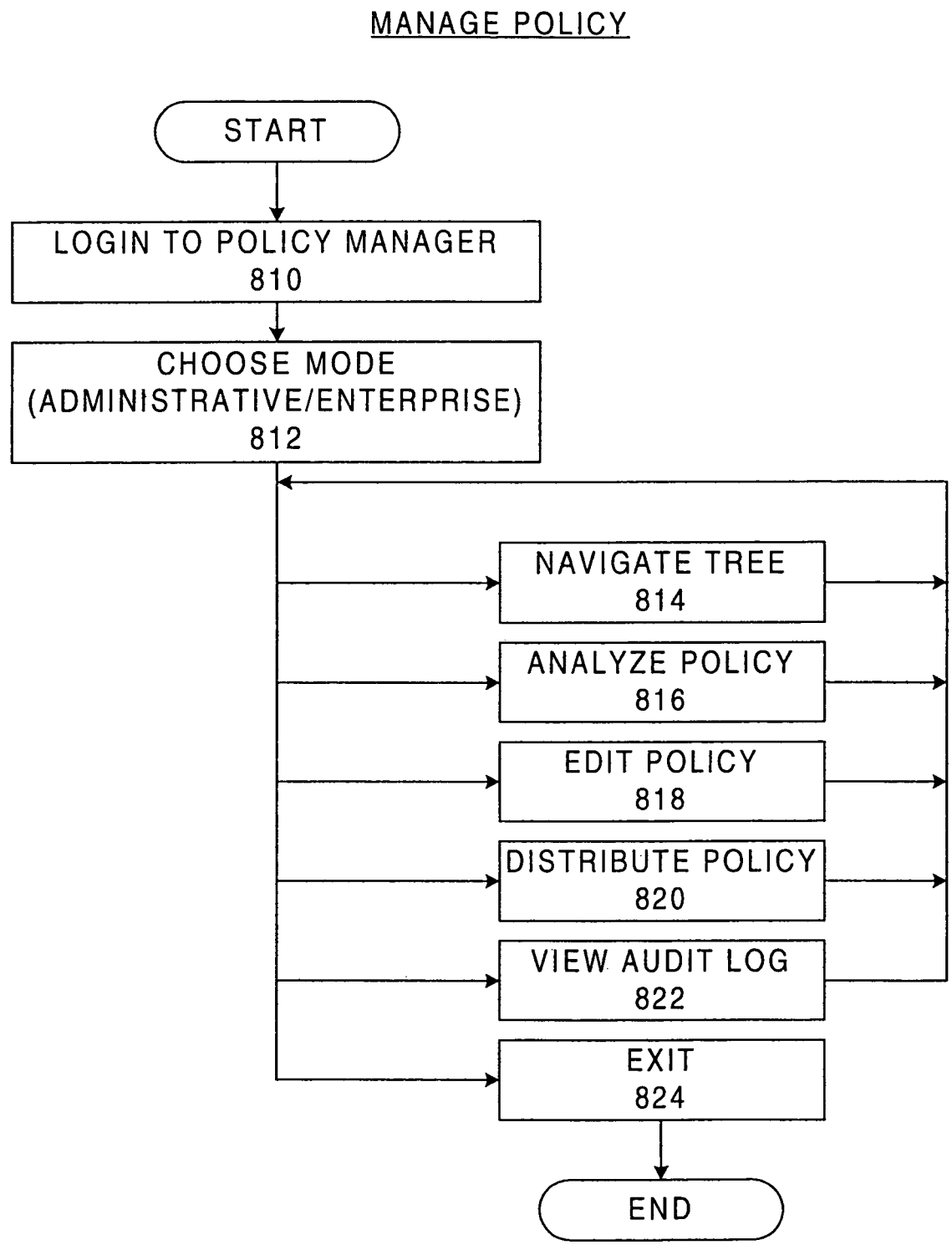
FIG. 8 is a flowchart of one embodiment to manage policy in the management station, according to the present invention.

Referring now to FIG. 8, a flowchart of one embodiment to manage policy under management services 412 in management station 212 is shown. In order to allow for a complex set of policy rules, a number of different functionality features are incorporated into system 110 to facilitate implementation and management.

In the FIG. 8 embodiment, at step 810, an authorized administrator logs in to policy manager 210. Next, in step 812, the authorized administrator chooses between administrative mode or enterprise mode. The administrative mode allows the system administrator to manage administrative policy 226, and the enterprise mode allows the system administrator to manage enterprise policy 224. The system administrator is then presented with six menu options including navigate tree 814, analyze policy 816, edit policy 818, distribute policy 820, view audit log 822, and exit 824. The features of navigate tree 814, analyze policy 816, edit policy 818, and distribute policy 820 are described in more detail through FIGS. 9, 10, 11, and 12, respectively. View audit log 822 is a security feature that allows an administrator to view and track all authorization requests that have occurred at any application guards 310 connected to system 110. The system administrator can choose any of the menu options, or at step 824 the system administrator may then exit the system.

Figure 9:
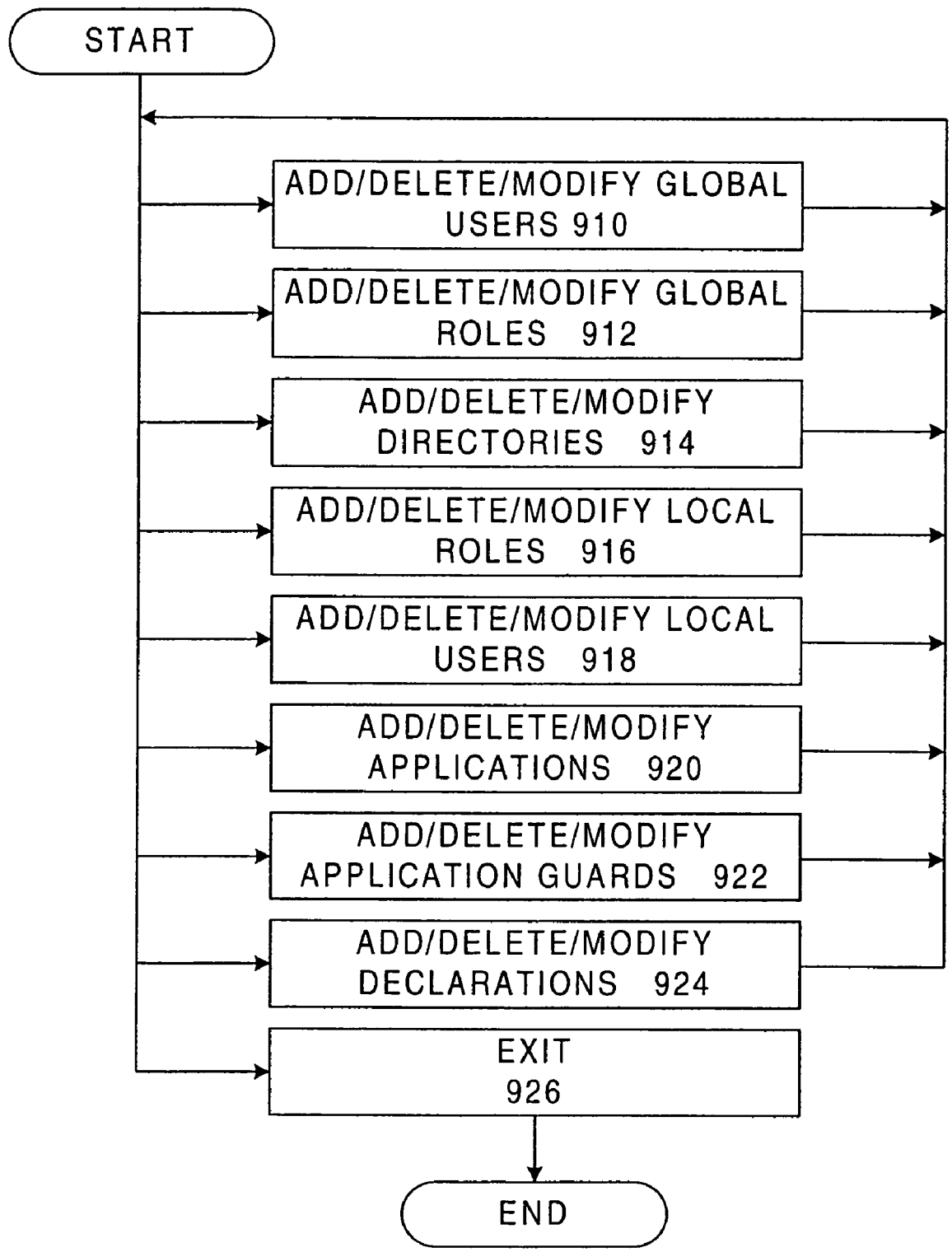
FIG. 9 is a flowchart of one embodiment to navigate tree in the management station, according to the present invention.

Referring now to FIG. 9, a flowchart of one embodiment of menu option navigate tree 814 in management station 212 is shown. Navigate tree 814 provides a set of options for an administrator to add, delete, and/or modify features on server 112 or client 116. The features that an administrator may add, delete, and/or modify include global users 910, global roles 912, directories 914, local roles 916, local users 918, applications 920, application guards 922, and declarations 924. At step 926, the system administrator may then exit from navigate tree 814.

Figure 10:
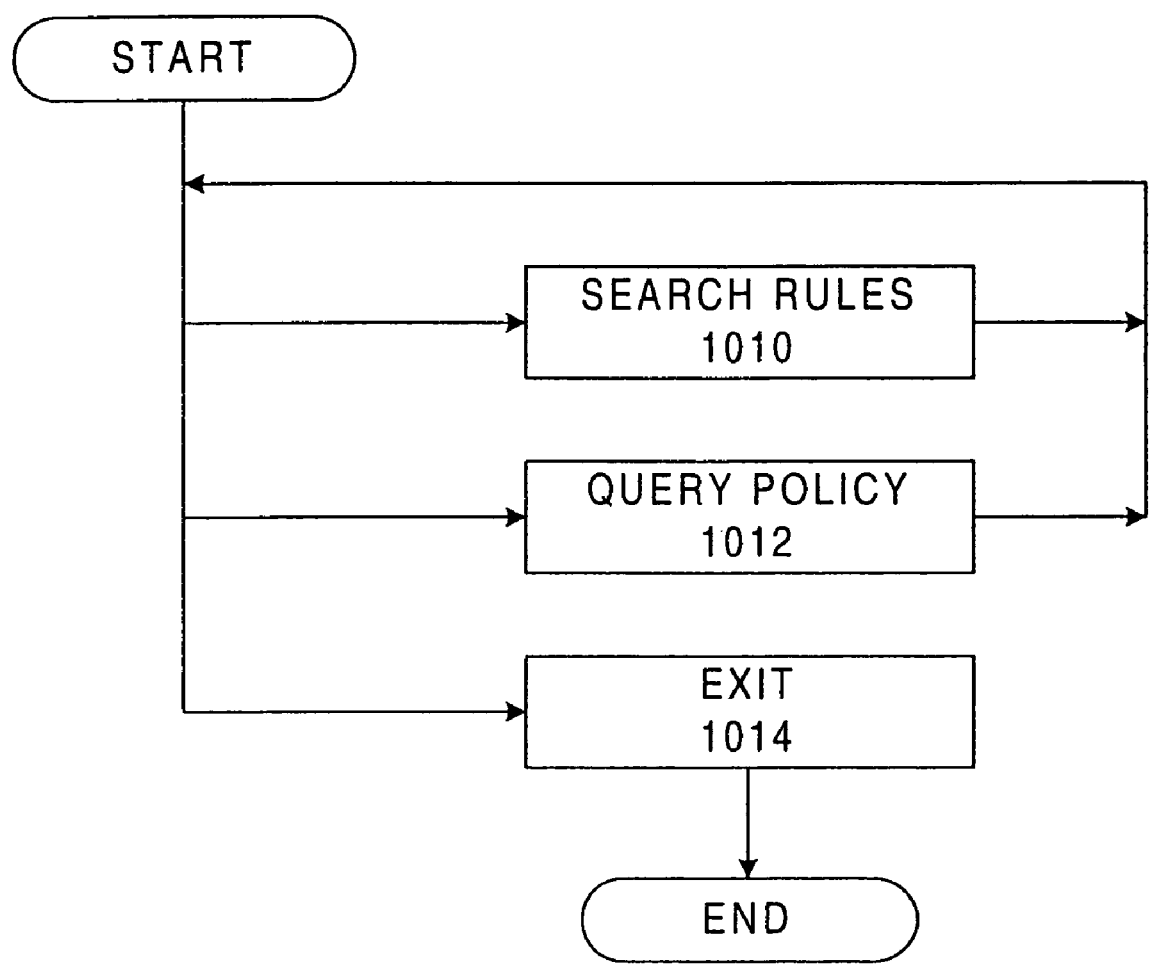
FIG. 10 is a flowchart of one embodiment to analyze policy in the management station, in accordance with the present invention.

Referring now to FIG. 10, a flowchart of one embodiment of menu option analyze policy 816 in management station 212 is shown. Analyze policy 816 preferably allows an authorized user to analyze and view rules and policies within enterprise policy 224. At step 1010, the user has an option to search rules, or at step 1012 to query policy. When search rules is selected, a search can be made for all the grant rules or all the deny rules pertaining to a particular user. When query policy is selected, a search can be made on who is granted or denied what privilege on which objects under what conditions.

After analyzing and viewing rules or policies, at step 1014 the system administrator may exit from analyze policy 816.

Figure 11:
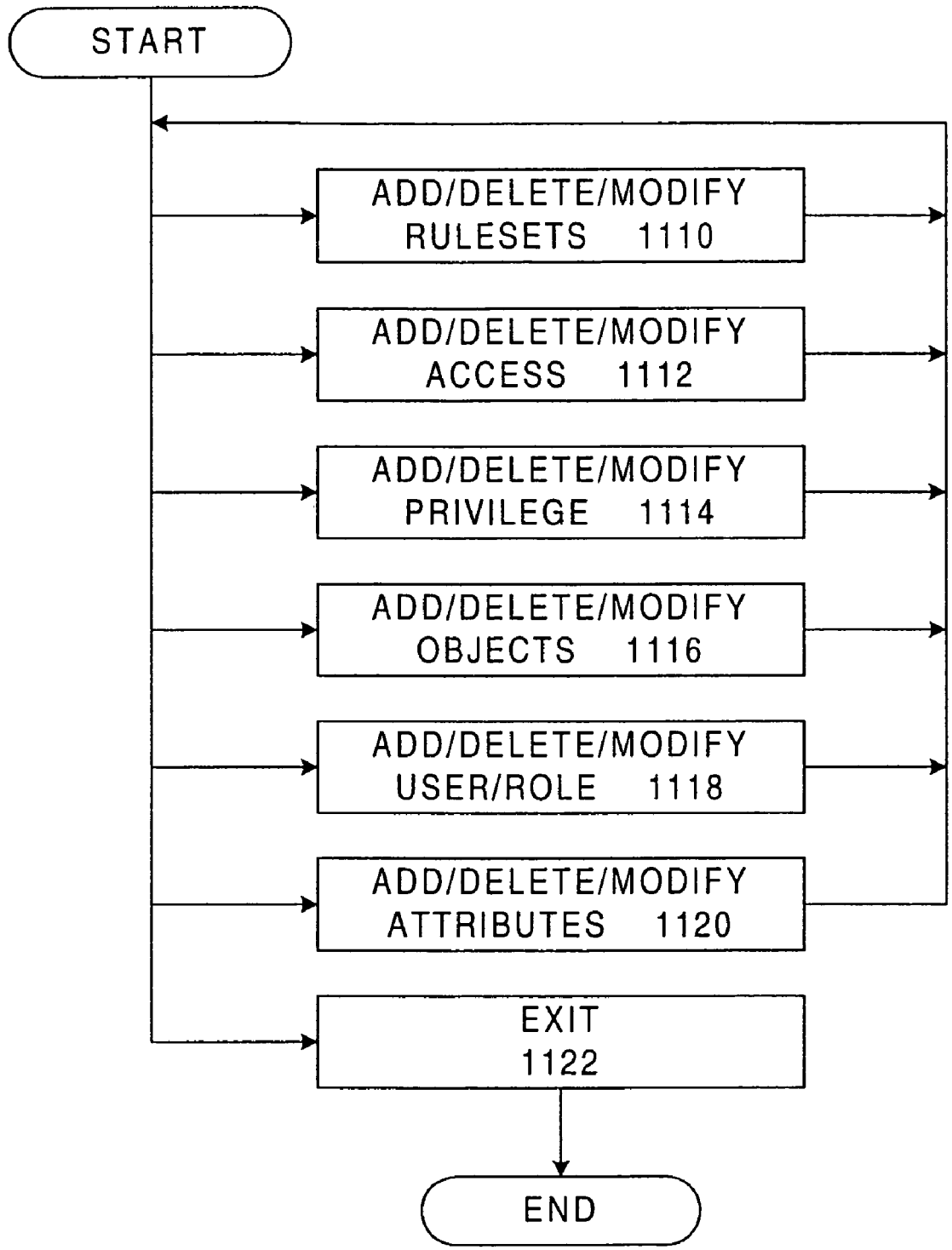
FIG. 11 is a flowchart of one embodiment to edit policy in the management station, in accordance with the present invention.

Referring now to FIG. 11, a flowchart of one embodiment of menu option edit policy 818 in management station 212 is shown. Edit policy 818 allows an authorized user to add, delete, and/or modify enterprise policy 224 features. The features that may be edited include rule sets 1110, access 1112, privilege 1114, objects 1116, user/role 1118, and attributes 1120. At step 1122, the system administrator may then exit edit policy 818.

Figure 12:
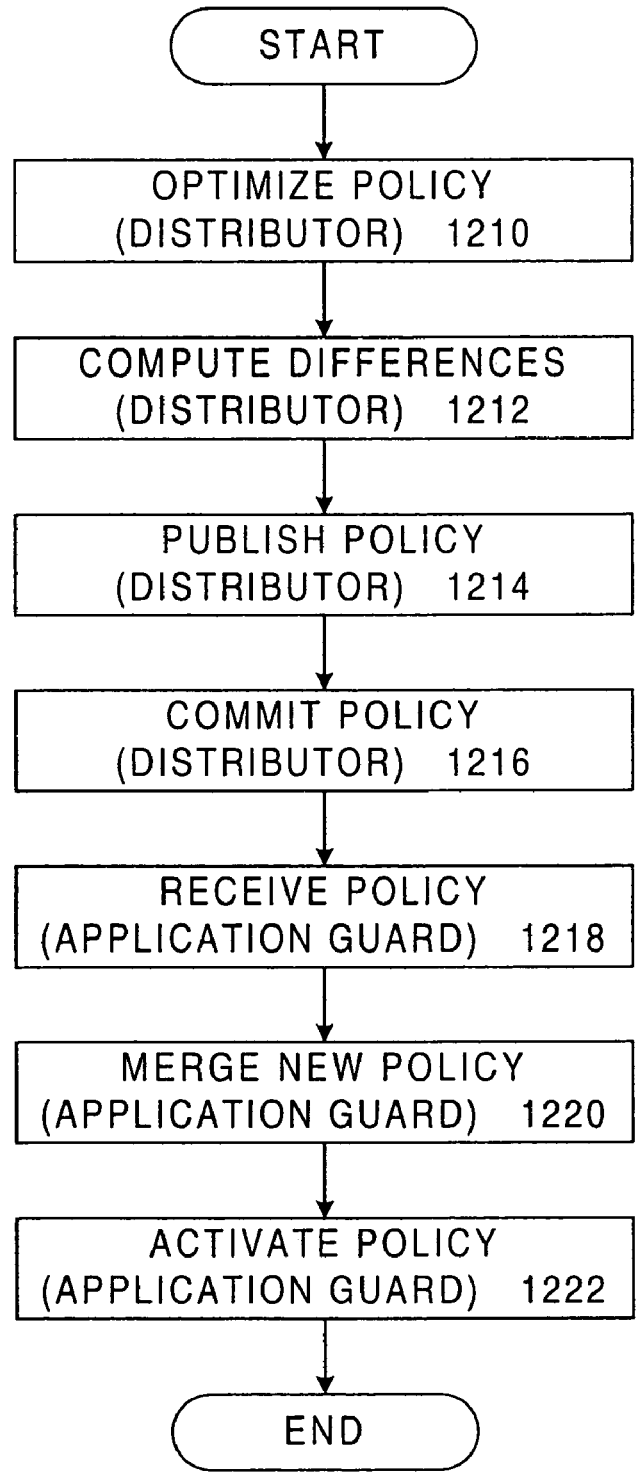
FIG. 12 is a flowchart of method steps to distribute policy, according to one embodiment of the present invention.

Referring now to FIG. 12, a flowchart of one embodiment of method steps of menu option distribute policy 820 is shown. After enterprise policy 224 has been initially entered or modified in any way, the modified features of enterprise policy 224 may then be distributed to appropriate application guards 310. At step 1210, upon selecting the distribute policy option, distributor 214 optimizes enterprise policy 224. Then at step 1212, differ 438 preferably computes any difference between the newly optimized policy and optimized policy 222. At step 1214, the newly optimized policy is then published as optimized policy 222 in DBMS 218. Next, at step 1216, only the changed portions of optimized policy 222 are committed to appropriate application guards 310. At step 1218, application guards 310 receive the changed policy, and then at step 1220, application guards 310 merge the changed policy into local client policy 318. Next at step 1222, new local client policy 318 is activated to work with application guard 310.

Figure 13:
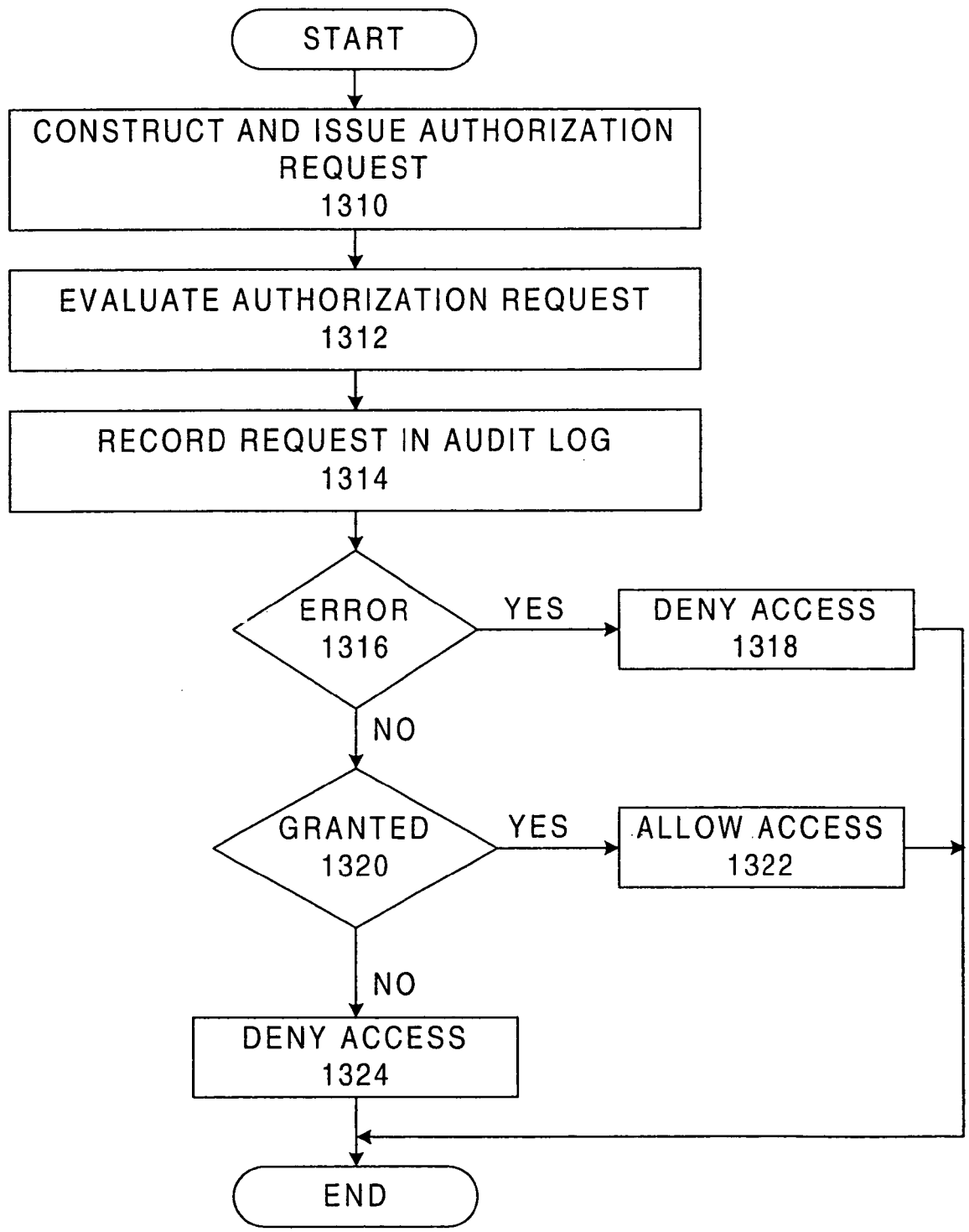
FIG. 13 is a flowchart of method steps for client access authorization, in accordance with one embodiment of the present invention.

Referring now to FIG. 13, a flowchart of one embodiment of method steps for client access authorization is shown. The FIG. 13 example for using a standard application guard 310 by a user begins with a user requesting access to a securable component protected by an application guard 310. In step 1310, application guard 310 constructs and issues an authorization request. At step 1312, the authorization request is evaluated by application guard 310 according to its local client policy 318 to determine whether to allow or deny the authorization request. At step 1314, audit 518 then records the authorization request in audit log 450. Next, at step 1316, if there is an error in the authorization request, or if the request is not valid, then at step 1318 the user is denied access. However, if the authorization request is valid, then at step 1320 it is determined whether access should be granted. If the evaluated authorization request does not deny access for the user, then at step 1322 access is allowed. If the evaluated authorization request denies access for the user, then at step 1324 access is denied.

Figure 14:
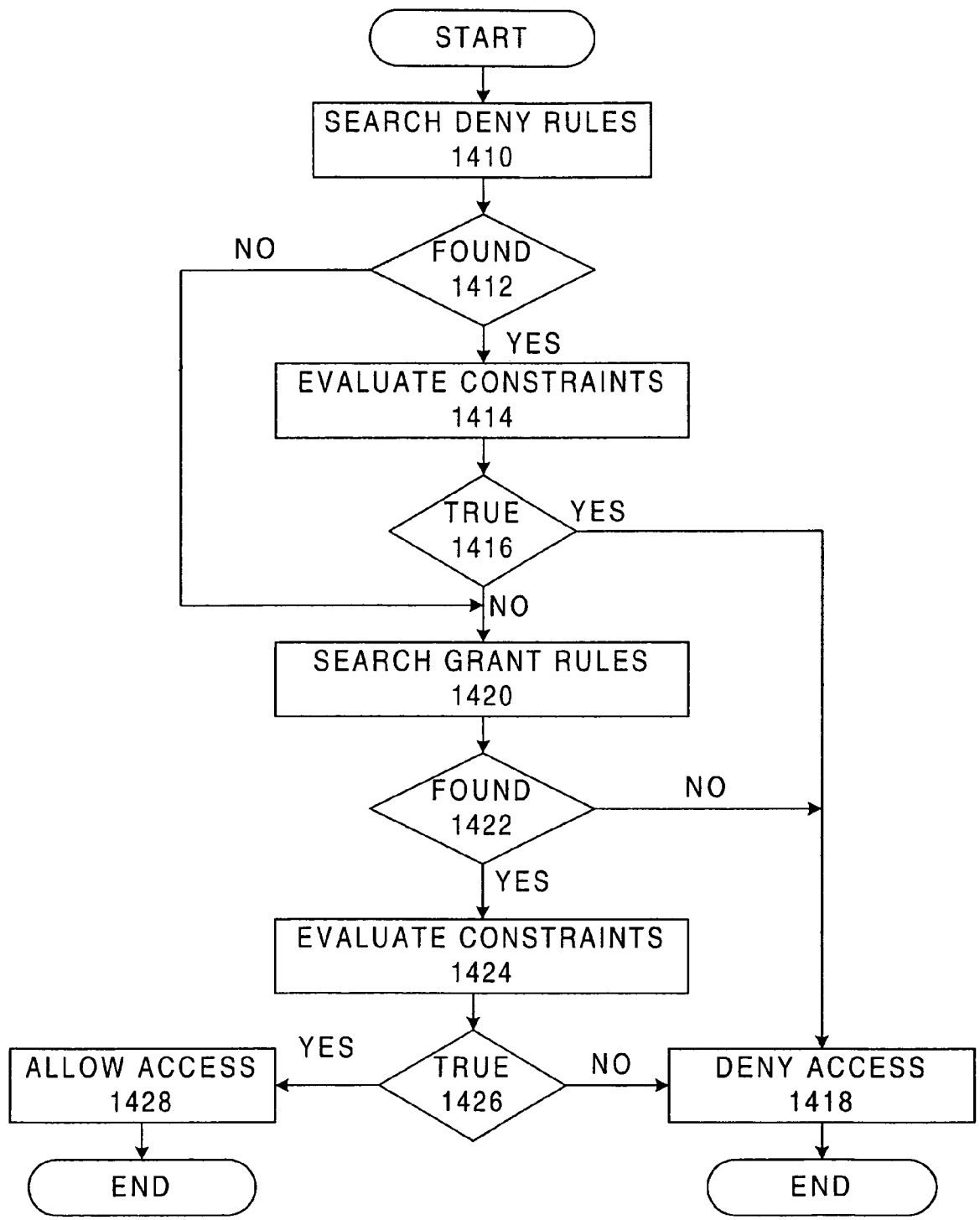
FIG. 14 is a flowchart of method steps to evaluate authorization request, according to one embodiment of the present invention.

Referring now to FIG. 14, a flowchart of one embodiment of method steps to evaluate an authorization request from an application guard 310 is shown. In order to evaluate an authorization request at application guard 310, in step 1420, evaluator 516 first searches any deny rules in local policy 318. At step 1412, if evaluator 516 finds any deny rules, then at step 1414, an evaluation is performed on any constraints on the deny rules. If, at step 1416, the evaluation finds presently valid constraints on the deny rules, then at step 1418 access is denied. However, if at step 1416, the evaluation finds that the constraints on the deny rules are not presently valid, or if no deny rules are found in foregoing step 1412, then at step 1420, a search of grant rules is performed. If no grant rules are found at step 1422 that would allow access for the user, then at step 1418, access is denied. If in step 1422 grant rules are found, then at step 1424 an evaluation is performed on any constraints in the grant rules. If the evaluated constraint is presently valid, then at step 1426, a true value is passed, and at step 1428 access is allowed. However, if the evaluated constraint is not presently valid, then at step 1426, a false value is passed, and at step 1418 access is denied.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for controlling access to a software application in accordance with enterprise and local security policies, comprising:
   a server that includes a policy manager to manage an enterprise set of security policies, and to distribute to each of a plurality of clients a subset of said enterprise set of security policies; and
   a plurality of clients, each client including an application guard, wherein the client receives the subset of security policies from the server and stores them locally on the client, and wherein the application guard then uses the local security policies to manage access by a user of the client to a software application;
   wherein said policy manager further includes:
      an optimizer component that determines, for each application guard, which subset of the enterprise set of security policies said each application guard should receive; and
      a differ component that computes a difference between the subset and any previous local security policy of said each application guard, such that the policy manager distributes only changed portions of the local security policy, which are applicable to said each application guard as determined by the optimizer element.

2. The system of claim 1, wherein the server distributes to each of said plurality of clients only those security policies that are relevant to that client.

3. The system of claim 1, wherein the software application is installed locally on one or more of the clients.

4. The system of claim 1, wherein the software application is installed on the server.

5. The system of claim 1, wherein the application guard assigns the user of the client a particular role to use with the software application.

6. The system of claim 5, wherein the application guard manages access by the user to a particular function of the software application.

7. The system of claim 6, wherein the assigned role includes a set of privileges to use the particular function of the software application.

8. The system of claim 7, wherein the particular software application is organized into a role hierarchy such that if a user is granted a certain role, then that user is automatically granted any children roles.

9. The system of claim 7, wherein the particular function of the software application is organized into a function hierarchy such that if a user is granted a privilege to a parent function, then that user is automatically granted the privilege to any children functions.

10. The system of claim 1, wherein the application guard runs as a service that allows the software application to make a request for authorization.

11. A method for controlling access to a software application in accordance with enterprise and local security policies, comprising the steps of:
   providing a server that includes a policy manager to manage an enterprise set of security policies, and distributing to each of a plurality of clients a subset of said enterprise set of security policies; and
   providing a plurality of clients, each client including an application guard, wherein the client receives the subset of security policies from the server and stores them locally on the client, and wherein the application guard then uses the local security policies to manage access by a user of the client to a software application;
   wherein said policy manager further includes:
      an optimizer component that determines, for each application guard, which subset of the enterprise set of security policies said each application guard should receive; and
      a differ component that computes a difference between the subset and any previous local security policy of said each application guard, such that the policy manager distributes only changed portions of the local security policy, which are applicable to said each application guard as determined by the optimizer element.

12. The method of claim 11, wherein the server distributes to each of said plurality of clients only those security policies that are relevant to that client.

13. The method of claim 11, wherein the software application is installed locally on one or more of the clients.

14. The method of claim 11, wherein the software application is installed on the server.

15. The method of claim 11, wherein the application guard assigns the user of the client a particular role to use with the software application.

16. The method of claim 15, wherein the application guard manages access by the user to a particular function of the software application.

17. The method of claim 16, wherein the assigned role includes a set of privileges to use the particular function of the software application.

18. The method of claim 17, wherein the particular software application is organized into a role hierarchy such that if a user is granted a certain role, then that user is automatically granted any children roles.

19. The method of claim 17, wherein the particular function of the software application is organized into a function hierarchy such that if a user is granted a privilege to a parent function, then that user is automatically granted the privilege to any children functions.

20. The method of claim 11, wherein the application guard runs as a service that allows the software application to make a request for authorization.

21. A computer readable medium, including instructions stored thereon, which when executed by a computer causes the computer to perform the steps of:
   providing a server that includes a policy manager to manage an enterprise set of security policies and a plurality of clients for enforcing the set of enterprise security policies;
   determining, for an application guard residing on a client, a subset of the enterprise set of security policies that is applicable to the application guard, said determining performed by an optimizer component of the policy manager;
   computing a difference between the subset and any previous local security policy of said application guard, said computing performed by a differ component of the policy manager; and
   distributing to each of the plurality of clients a changed portions of the subset of said enterprise set of security policies, wherein the client receives the changed portions of the subset of security policies from the server and stores them locally on the client, and wherein the application guard then uses the local security policies to manage access by a user of the client to a software application.

* * * * *

UNITED STATES PATENT AND TRADEMARK OFFICE
CERTIFICATE OF CORRECTION

PATENT NO. : 7,318,237 B2
APPLICATION NO. : 11/171104
DATED : January 8, 2008
INVENTOR(S) : Moriconi et al.

It is certified that error appears in the above-identified patent and that said Letters Patent is hereby corrected as shown below:

On page 3, in column 1, under "Other Publications", line 6, delete "Sunsted," and insert -- Sundsted, --, therefor.

On page 3, in column 1, under "Other Publications", line 18, delete "65-85," and insert -- 65-86, --, therefor.

On page 3, in column 1, under "Other Publications", line 23, delete "Instructions" and insert -- Instruction --, therefor.

On page 3, in column 1, under "Other Publications", line 35, delete "(TM" and insert -- ™ --, therefor.

On page 3, in column 2, under "Other Publications", line 16, delete "Enviornments" and insert -- Environments --, therefor.

On page 3, in column 2, under "Other Publications", line 22, delete "Seacrh" and insert -- Search --, therefor.

On page 3, in column 2, under "Other Publications", line 36, delete "Indiananpolis" and insert -- Indianapolis --, therefor.

In column 6, line 65, after "management" insert -- . --.

Signed and Sealed this

Sixteenth Day of March, 2010

David J. Kappos
*Director of the United States Patent and Trademark Office*